US006843298B1

(12) United States Patent
Borg et al.

(10) Patent No.: US 6,843,298 B1
(45) Date of Patent: Jan. 18, 2005

(54) APPARATUS FOR AUTOMATICALLY DEBONDING, PROCESSING, AND HANDLING FRAGILE SLIDER ROWS

(75) Inventors: John M. Borg, San Jose, CA (US); Sean M. Clemenza, San Jose, CA (US); Garrett T. Oakes, San Jose, CA (US); Katherine T. M. Tran, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 10/675,190

(22) Filed: Sep. 30, 2003

(51) Int. Cl.[7] .................................................. B32B 35/00

(52) U.S. Cl. ...................... 156/584; 156/344; 29/426.3; 29/426.6

(58) Field of Search ................................. 156/344, 584; 438/464, 976; 29/426.3, 426.6, 762

(56) References Cited

U.S. PATENT DOCUMENTS

| | | | | |
|---|---|---|---|---|
| 4,517,041 A | | 5/1985 | Hennenfent et al. | |
| 5,095,613 A | | 3/1992 | Hussinger et al. | |
| 5,509,193 A | * | 4/1996 | Nuxoll | 29/741 |
| 5,745,983 A | | 5/1998 | Quintana et al. | |
| 5,911,850 A | | 6/1999 | Zung | |
| 5,987,725 A | | 11/1999 | Church et al. | |
| 6,081,991 A | | 7/2000 | Tsunoda et al. | |
| 6,093,083 A | | 7/2000 | Lackey | |
| 6,332,264 B1 | | 12/2001 | Itoh et al. | |
| 6,374,479 B1 | | 4/2002 | Sasaki et al. | |
| 6,547,918 B2 | | 4/2003 | Nomura et al. | |
| 6,551,438 B1 | | 4/2003 | Tanemura | |
| 2002/0016130 A1 | | 2/2002 | Nomura et al. | |
| 2003/0119421 A1 | | 6/2003 | Nomura et al. | |

FOREIGN PATENT DOCUMENTS

| | | |
|---|---|---|
| JP | 3295017 | 12/1991 |
| JP | 9207044 | 8/1997 |
| JP | 9270114 | 10/1997 |

* cited by examiner

*Primary Examiner*—Mark A. Osele
(74) *Attorney, Agent, or Firm*—Bracewell & Patterson, LLP

(57) ABSTRACT

An automatic thermal debonding tool removes slider rows from a stainless steel processing fixture. The tool uses a bimodal pitch adjustment and a mechanical row detainment mechanism to remove the rows from the fixture. The tool allow full control of all critical process parameters such as accurate and repeatable row placement; controlled temperature and heat flow; controlled mechanical removal pressure; temporal control and variability; clean and contaminant-free working area; and full electrostatic discharge grounding and compatible materials. The bimodal pitch adjustment feature allows for continual, high-speed removal of the ceramic rows from the fixture after an automated heating cycle is complete. As the rows are removed, they are accurately placed into the detainment mechanism for the next process step.

18 Claims, 8 Drawing Sheets

APPARATUS FOR AUTOMATICALLY DEBONDING, PROCESSING, AND HANDLING FRAGILE SLIDER ROWS

BACKGROUND OF THE INVENTION

1. Technical Field

The present invention relates in general to an improved device for handling slider rows and, in particular, to an improved apparatus for automatically debonding, processing, and handling fragile slider rows.

2. Description of the Related Art

Hard disk drives (HDD) include one or more disks and a disk controller to manage local operations concerning the disks. The disks are mounted on a spindle that is turned by a disk drive motor at several thousand revolutions per minute (rpm). A typical HDD also utilizes an actuator assembly to move magnetic read/write heads to desired locations on the rotating disk to write information to or read data from that location. Within most HDDs, the magnetic read/write heads are mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Fabricating sliders is a very delicate process that requires numerous precise operations. Some sliders are formed by first manufacturing a continuous row or bar of the sliders that is then cut into the individual sliders. The bars, which are usually formed from a very fragile ceramic material, are bonded to a carrying fixture for a series of vacuum and photolithographic operations. After these operations are complete, it is necessary to very carefully remove the bonded bars from the carrying fixture due to the very fragile and sensitive nature of the bars. The following are potential areas of damage that must be considered, avoided, and/or minimized during this sequence of debonding processes: electrostatic discharge (ESD); mechanical scratching; physical chipping or cracking (conchoidal fracturing) of substrate; mechanical bending, burning, or denting of submicron features; and organic and inorganic contamination.

In the prior art, completely manual processes have been used to debond slider rows and are the only known solutions. Several attempts to automate this process have failed. The following drawbacks are associated with manual processing: No process repeatability monitoring; no process control; messy, dirty operation; uncontrolled contamination of parts is inherent to process; electrostatic discharge (ESD) damage to the heads; high temperatures are hazardous to the operator; the tool damages the heads; and significant manual handling; thermal and temporal variability due to operator influence. Thus, an improved apparatus for automatically debonding, processing, and handling fragile slider rows would be desirable.

SUMMARY OF THE INVENTION

One embodiment of an apparatus constructed in accordance with the present invention utilizes an automatic thermal debonding tool for removing slider bars or rows (e.g., pico rows) from a stainless steel processing fixture. The tool automates a previously manual process by using a unique, bimodal pitch adjustment in concert with a mechanical row detainment mechanism to remove the ceramic rows from the stainless steel fixture. The process and tool not only eliminate or improve all of the problems associated with the manual process (described above), but they also allow full control of all critical process parameters, which include: accurate and repeatable row placement; controlled temperature and heat flow; controlled mechanical removal pressure; temporal control and variability; clean and contaminant-free working area; and full electrostatic discharge grounding and compatible materials.

The present invention relies on at least two innovative design features that together achieve a novel and functional process and tool. The bimodal pitch adjustment feature allows for continual, high-speed removal of the ceramic rows from the fixture after an automated heating cycle is complete. As the rows are removed, they are accurately placed into a holding fixture that is ready for the next process step. A row removal device uses a beveled tooth to individually push the rows off of the carrying fixture, and place them directly onto the row detainment fixture or mechanism.

Another design feature of the present invention includes the independent bar detainment mechanism that uses spring-loaded, "piano style" keys to hold each individual row quickly and tenaciously once it has been placed into the holding fixture. The fixture has row separation teeth, and a row realignment mechanism. Simplicity of design also distinguishes the present invention. The process and tool incorporate several steps (e.g., debonding, separating, and placing) into a single step so that the rows can be further processed in a highly efficient manner. The previous or prior art manual techniques required two or more steps with manual handling of each individual row, which resulted in significant product losses.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
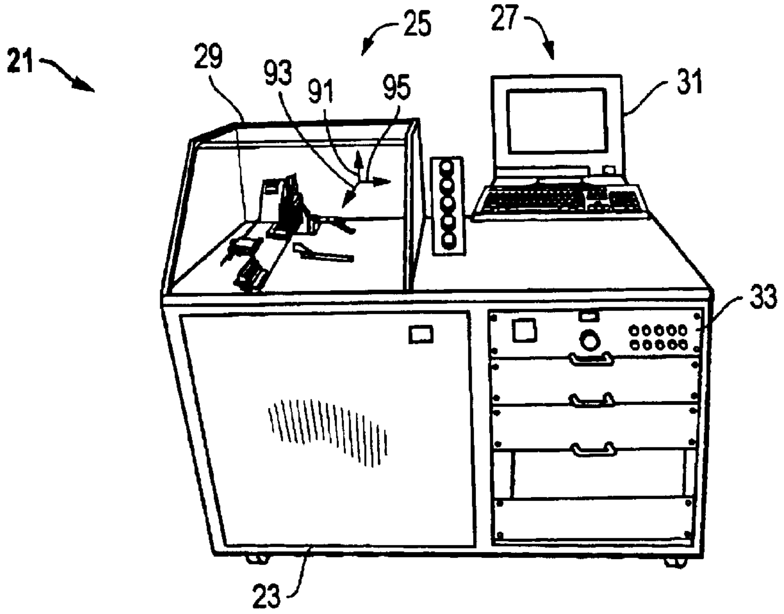
FIG. 1 is an isometric view of one embodiment of an apparatus for automatically debonding slider rows and is constructed in accordance with the present invention.

Referring to FIG. 1, one embodiment of an apparatus 21 for manipulating and processing workpieces is shown. The apparatus 21 is ideally suited for debonding slider row workpieces, but is readily adaptable to handle other types of workpieces as well. FIG. 1 shows an overall view of the apparatus 21, including a chassis or frame 23 for supporting a work area 25 and a control system 27. In the embodiment shown, the work area 25 is covered by a safety shield 29, and the control system 27 includes a computer 31 and input/output drawers 33. The control system 27 controls operations of the apparatus 21 along an x-axis 91, a y-axis 93, and z-axis 95. The control system 27 has full control of all critical process parameters, including accurate and repeatable workpiece placement, controlled temperature and heat flow, and controlled mechanical removal pressure, temporal control, and variability.

Figure 2:
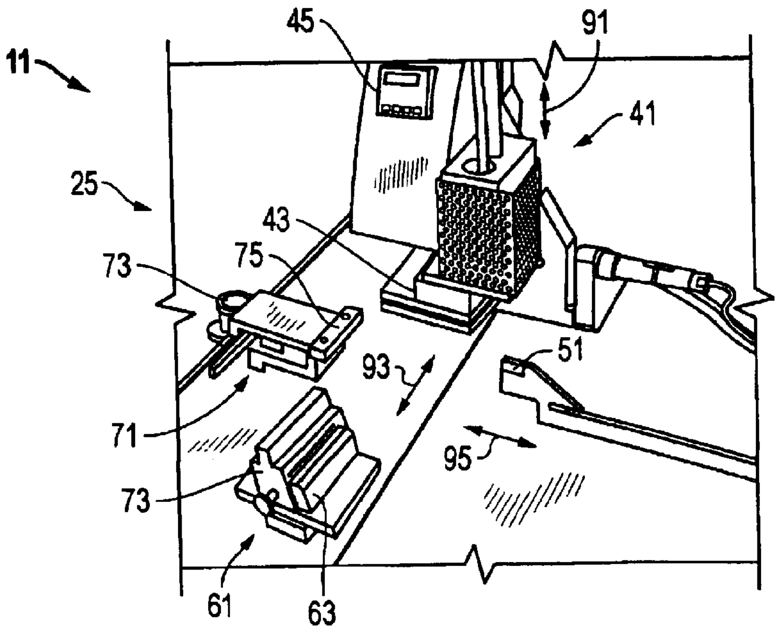
FIG. 2 is an enlarged isometric view of a processing area of the apparatus of FIG. 1.

Referring again to FIG. 2, an enlarged view of the work area 25 for processing the workpieces is shown. In work area 25, the apparatus 21 comprises a heating element 41, a bimodal pitch adjustment device 51, a detainment mechanism 61, and a realignment mechanism 71, each of which will be described in greater detail below. Other equipment located in work area 25 includes a bar code scanner 43 and a process control thermometer 45.

Figure 3:
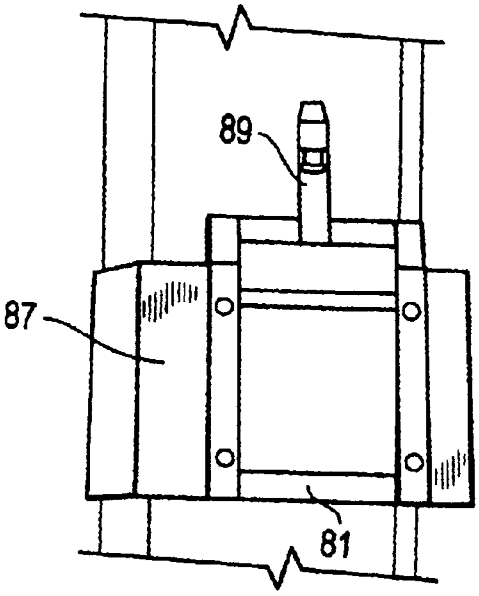
FIG. 3 is a plan view of an unloaded fixture used in the processing area of FIG. 2.
Figure 4:
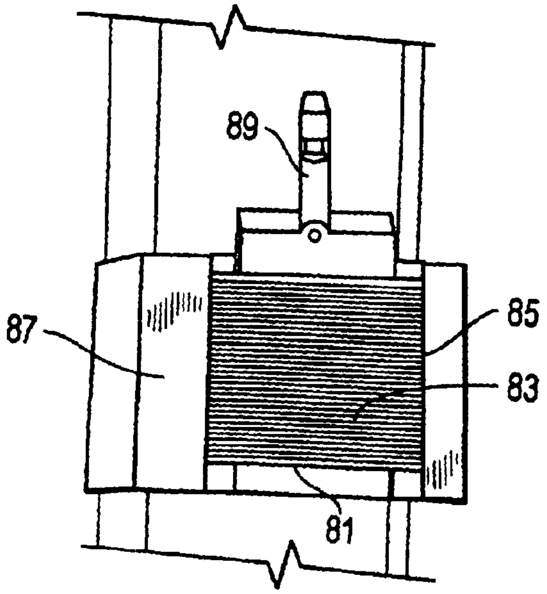
FIG. 4 is a plan view of the fixture of FIG. 3 loaded with bonded rows.
Figure 5:
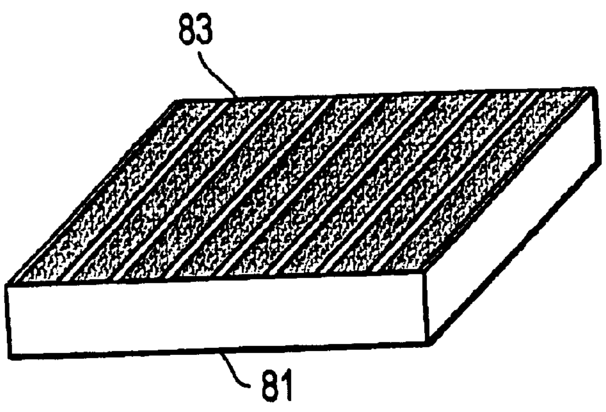
FIG. 5 is a schematic isometric view of the loaded fixture of FIG. 4.
Figure 6:
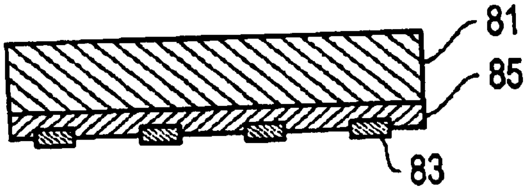
FIG. 6 is a schematic sectional side view of the loaded fixture of FIG. 4.
Figure 7:
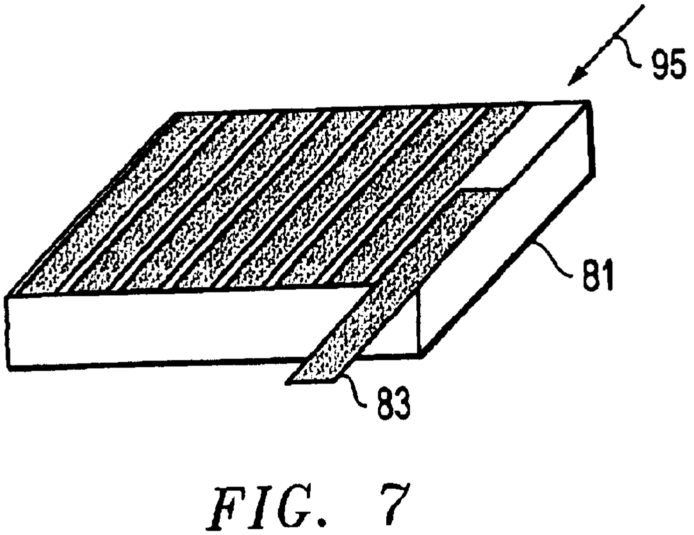
FIG. 7 is a schematic isometric view of the loaded fixture of FIG. 4 during an unloading sequence.
Figure 8:
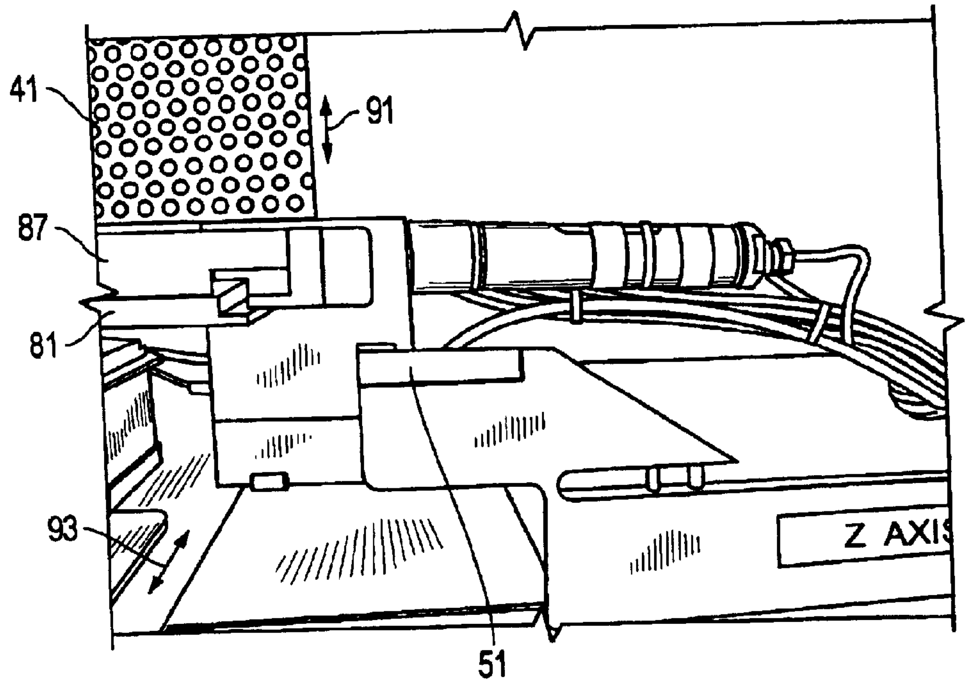
FIG. 8 is a front view of bimodal pitch adjustment feature used in the processing area of FIG. 2.

The heating element 41 is designed to receive a carrier 81 (FIGS. 3–7) that supports a plurality of workpieces 83 thereon. In the embodiment shown, each workpiece 83 comprises a slider row that is bonded to the carrier 81 with a thermally activated adhesive 85 (FIGS. 4 and 6). The carrier 81 is mounted in a fixture 87 (FIGS. 3 and 4) that is designed to attach to the heating element 41 (FIG. 8). The fixture 87 is provided with precise tooling features 89 that accurately locate and position the carrier 81 with respect to the heating element 41. When the carrier 81 is mounted to heating element 41 via the fixture 87, the heating element 41 is adapted to and automatically heats and reactivates the thermally activated adhesive 85 that bonds the workpieces 83 to the carrier 81. When the adhesive 85 is reactivated, the workpieces 83 are movable relative to and removable from the carrier 81. In addition, the heating element 41 and, thus, the carrier 81 is movable along an x-axis 91 and a y-axis 93.

Figure 9:
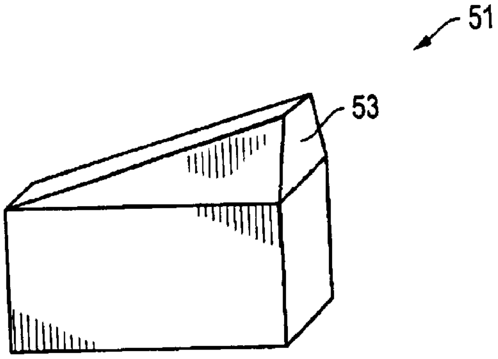
FIG. 9 is an enlarged isometric view of the tooth on the bimodal pitch adjustment feature of FIG. 8.

After the carrier 81 mounted to the heating element 41, the bimodal pitch adjustment device 51 is designed to automatically align with individual ones of the workpieces 83. The heating element 41 is moved along the x-axis 91 to align in the x-direction with the device 51. Alignment along the y-axis 93 is provided by additional relative movement between the heating element 41 and the device 51. The device 51 has a very small beveled tooth 53 (FIGS. 8–10) that precisely aligns with one of the workpieces 83. The beveled tooth 53 is preferably tapered in at least two dimensions to provide a small contact area for a workpiece 83, and may be formed from hardened stainless steel. The beveled tooth 53 moves with the device 51 to engage the workpiece 83 along the z-axis 95. In this way, the device 51 automatically displaces the workpiece 83 along the z-axis 95.

The detainment mechanism 61 (FIGS. 2 and 10–17) is designed to directly receive the workpieces 83 when they are displaced from the carrier 41 by the bimodal pitch adjustment device 51. In the embodiment shown, the detainment mechanism 61 comprises a block 63 and a retention feature 65 that is removably mounted to the block 63. The retention feature 65 is shown removed from the block 63 in FIG. 14. The detainment mechanism 61 uses spring-loaded actuators 102 with pivoting keys 67 and workpiece-separating teeth 69 to hold each individual workpiece 83 in the detainment mechanism 61. The keys 67 may pivot about a hinge or pivot pin 101 and are biased downward along the x-axis 91, as shown in FIGS. 10, 12, and 15–17.

Figure 10:
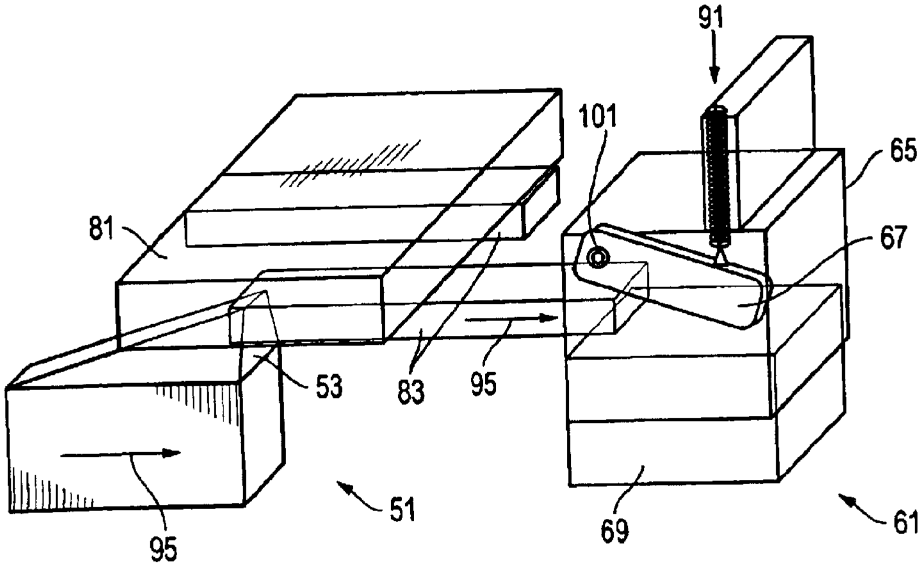
FIG. 10 is an isometric view of the tooth of FIG. 9 in operation while pushing a row off of the fixture of FIG. 4.
Figure 11:
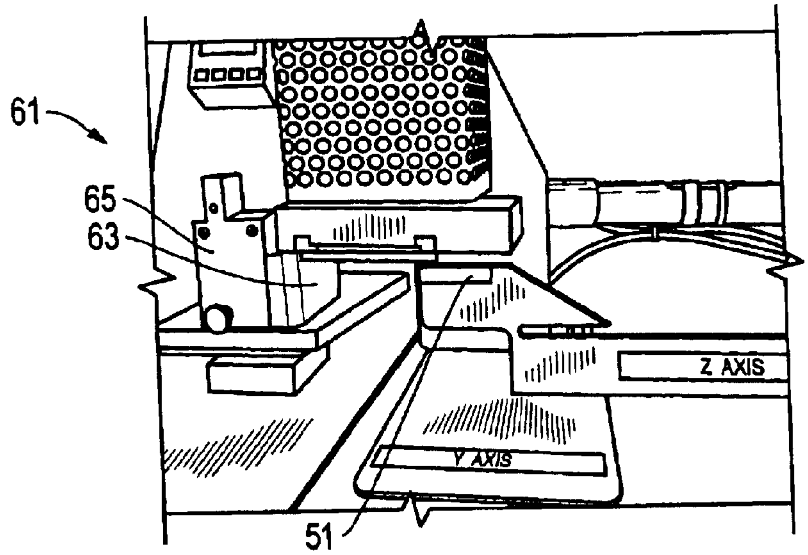
FIG. 11 is a front isometric view of the bimodal pitch adjustment feature of FIG. 8 in operation pushing a row off of the fixture of FIG. 4 into a detainment mechanism.
Figure 12:
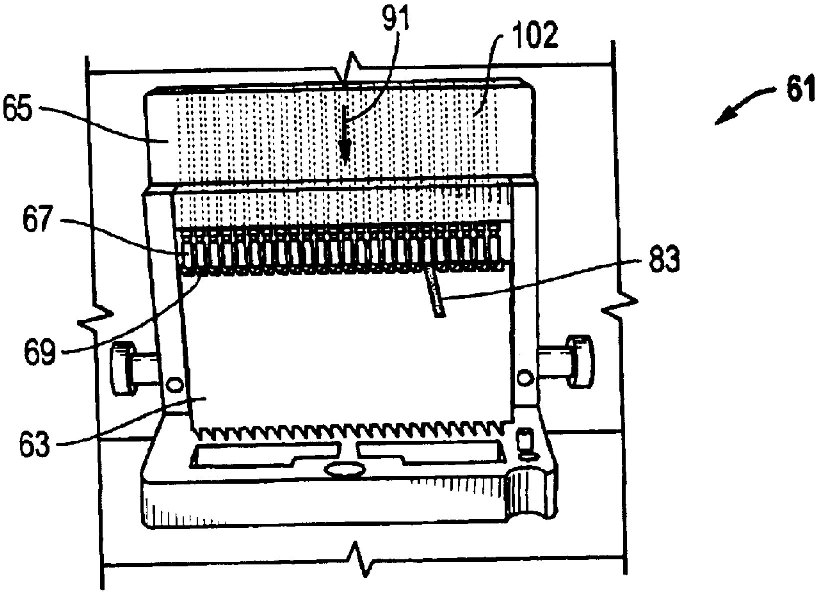
FIG. 12 is a front view of the detainment mechanism of FIG. 11.
Figure 13:
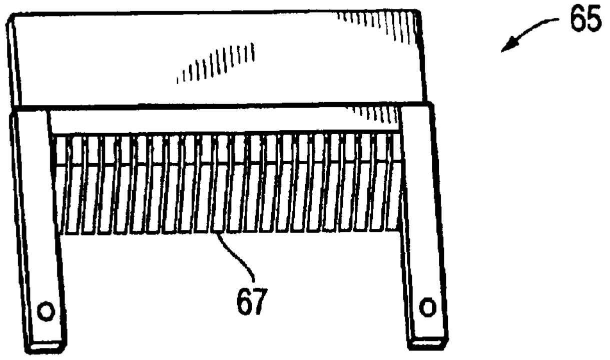
FIG. 13 is a front view of a retention portion of the detainment mechanism of FIG. 12.
Figure 14:
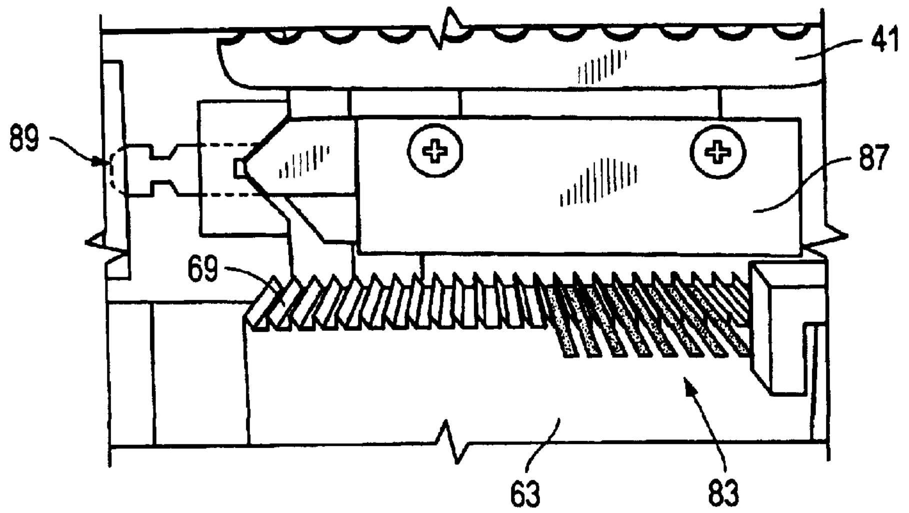
FIG. 14 is an enlarged rear view of the operation of FIG. 11 with the detainment mechanism half full with rows.
Figure 15:
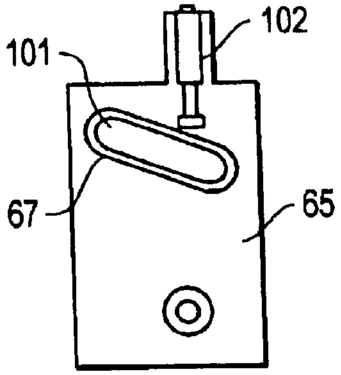
FIG. 15 is a side view of the detainment mechanism of FIG. 11 showing internal components thereof.
Figure 16:
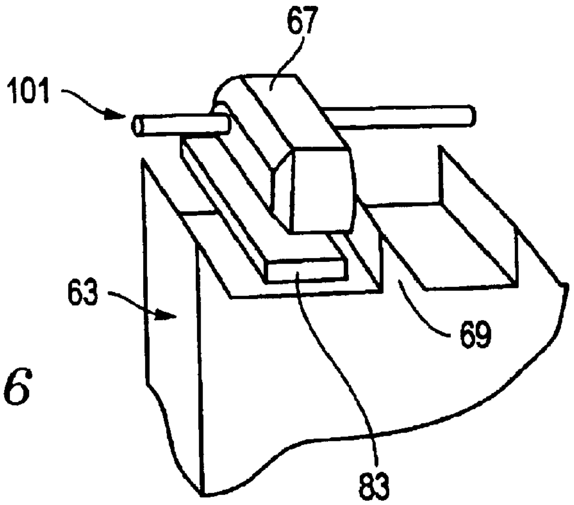
FIG. 16 is an enlarged rear isometric view of the detainment mechanism of FIG. 11 in operation.
Figure 17:
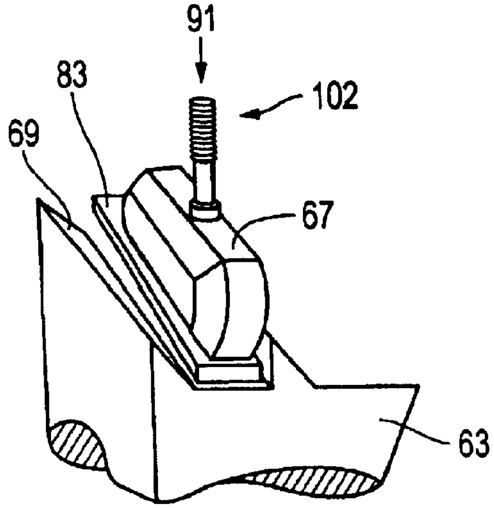
FIG. 17 is an enlarged rear isometric view of the detainment mechanism of FIG. 11 in operation.

Various elements of the detainment mechanism 61, such as the block 63, the keys 67, and the teeth 69, may be formed from materials that do not react with either the thermally activated adhesive 85 or the workpieces 83 themselves. In addition, the z-dimension length of the workpieces 83 is greater than the z-dimension width of the block 63, as shown in FIG. 14. FIG. 10 shows an embodiment of the combination of the bimodal pitch adjustment device 51 and the detainment mechanism 61.

The apparatus 21 further comprises the row or workpiece realignment mechanism 71 (FIG. 2) for realigning the workpieces 83 in the detainment mechanism 61 along the z-axis 95 after they have been placed there by the device 51. In the embodiment shown, the realignment mechanism 71 uses a cam 73 to move a flat rail 75 in order to realign the workpieces 83 with each other. This mechanism and step are needed since the device 51 may not align the workpieces 83 in the z-direction when they are offloaded from the carrier 41 to the detainment mechanism 61.

In addition, the workpieces 83 are spaced apart from each other at a first y-axis pitch (center-to-center spacing) when they are located in the carrier 41. However, the workpieces 83 are spaced apart from each other at a second y-axis pitch, which differs from (and is greater than) the first y-axis pitch, when they are located in the detainment mechanism 61. This difference in pitch is due to the tightly-packed configuration of the workpieces 83 that is needed at the carrier level. The apparatus 21 can move at least one of the heating element 41, the bimodal pitch adjustment device 51, and the detainment mechanism 61 incrementally along the y-axis with respect to each other to facilitate alignment and positioning therebetween.

The present invention has several advantages, including the ability to automatically debond slider rows from a stainless steel processing fixture. The invention automates the prior art manual process by using a unique, bimodal pitch adjustment and a mechanical row detainment mechanism to remove the rows from the fixture. The process and tool not only eliminate or improve all of the problems associated with the manual process, but they also allow full control of all critical process parameters, including accurate and repeatable row placement; controlled temperature and heat flow; controlled mechanical removal pressure; temporal control and variability; clean and contaminant-free working area; and full electrostatic discharge grounding and compatible materials.

The present invention has at least two innovative design features that together achieve a novel and functional process and tool. The bimodal pitch adjustment feature allows for continual, high-speed removal of the ceramic rows from the fixture after an automated heating cycle is complete. As that rows are removed, they are accurately placed into a holding fixture that is ready for the next process step. The bar detainment mechanism holds each individual row quickly and tenaciously once it has been placed into the holding fixture. Simplicity of design also distinguishes the present invention. The process and tool incorporate debonding, separating, and placing into a single step so that the rows can be further processed in a highly efficient manner.

While the invention has been shown or described in only some of its forms, it should be apparent to those skilled in the art that it is not so limited, but is susceptible to various changes without departing from the scope of the invention.

What is claimed is:

1. An apparatus, comprising:

a heating element for receiving a carrier that supports workpieces thereon in a thermally activated adhesive, the heating element being adapted to heat and reactivate the thermally activated adhesive, and the heating element being movable along an x-axis and a y-axis;

a bimodal pitch adjustment device for aligning with individual ones of the workpieces and displacing said individual ones of the workpieces along a z-axis, the bimodal pitch adjustment device also being movable along the y-axis;

a detainment mechanism for receiving the workpieces when they are displaced from the carrier by the bimodal pitch adjustment device; and a control processor for controlling operations of the apparatus along the x, y, and z axes, the control processor having full control of all critical process parameters, including accurate and repeatable workpiece placement, controlled temperature and heat flow, and controlled mechanical removal pressure, temporal control, and variability.

2. The apparatus of claim 1, wherein the bimodal pitch adjustment device comprises a beveled tooth that precisely aligns with one of the workpieces, the beveled tooth being tapered in at least two dimensions to provide a small contact area for said one of the workpieces.

3. The apparatus of claim 1, wherein the bimodal pitch adjustment device has a beveled hardened steel tooth for pushing the workpieces individually off of the carrier and placing them directly into the detainment mechanism.

4. The apparatus of claim 1, wherein the detainment mechanism comprises a block and a retention feature removably mounted to the block.

5. The apparatus of claim 4, wherein the block is formed from a material that does not react with either the thermally activated adhesive or the workpieces.

6. The apparatus of claim 1, wherein the detainment mechanism uses spring-loaded keys and workpiece-separating teeth to hold each individual workpiece in the detainment mechanism.

7. The apparatus of claim 6, wherein the keys are formed from a material that does not react with either the thermally activated adhesive or the workpieces.

8. The apparatus of claim 1, further comprising a row realignment mechanism for realigning the workpieces in the detainment mechanism along the z-axis.

9. The apparatus of claim 1, wherein the workpieces are spaced apart from each other at a first y-axis pitch when they are located in the carrier, and the workpieces are spaced apart from each other at a second y-axis pitch, that differs from the first y-axis pitch, when they are located in the detainment mechanism, and the apparatus moves at least one of the heating element, the bimodal pitch adjustment device, and the detainment mechanism incrementally along the y-axis with respect to each other to facilitate alignment therebetween.

10. An apparatus, comprising:

a heating element for receiving a carrier that supports workpieces thereon in a thermally activated adhesive, the heating element being adapted to automatically heat and reactivate the thermally activated adhesive, and the heating element being movable along an x-axis and a y-axis;

a bimodal pitch adjustment device for automatically aligning with individual ones of the workpieces and automatically displacing said individual ones of the workpieces along a z-axis, the bimodal pitch adjustment device also being movable along the y-axis and having a beveled tooth for pushing the workpieces individually off of the carrier;

a detainment mechanism for receiving the workpieces when they are displaced from the carrier by the bimodal pitch adjustment device, the detainment mechanism having spring-loaded keys and workpiece-separating teeth to hold each individual workpiece in the detainment mechanism; and a control processor for controlling operations of the apparatus along the x, y, and z axes, the control processor having full control of all critical process parameters, including accurate and repeatable workpiece placement, controlled temperature and heat flow, and controlled mechanical removal pressure, temporal control, and variability.

11. The apparatus of claim 10, wherein the beveled tooth precisely aligns with one of the workpieces and is tapered in at least two dimensions to provide a small contact area for said one of the workpieces.

12. The apparatus of claim 10, wherein the detainment mechanism comprises a block and a retention feature removably mounted to the block.

13. The apparatus of claim 12, wherein the block and the keys are formed from materials that do not react with either the thermally activated adhesive or the workpieces.

14. The apparatus of claim 10, further comprising a row realignment mechanism for realigning the workpiece in the detainment mechanism along the z-axis.

15. The apparatus of claim 10, wherein the workpieces are spaced apart from each other at a first y-axis pitch when they are located in the carrier, and the workpieces are spaced apart from each other at a second y-axis pitch, that differs from the first y-axis pitch, when they are located in the detainment mechanism, and the apparatus moves at least one of the heating element, the bimodal pitch adjustment device, and the detainment mechanism incrementally along the y-axis with respect to each other to facilitate alignment therebetween.

16. An apparatus, comprising:

a heating element for receiving a carrier that supports workpieces thereon in a thermally activated adhesive, the heating element being adapted to automatically heat and reactivate the thermally activated adhesive, and the heating element being movable along an x-axis and a y-axis;

a bimodal pitch adjustment device for automatically aligning with individual ones of the workpieces and automatically displacing said individual ones of the workpieces along a z-axis, the bimodal pitch adjustment device also being movable along the y-axis and having a beveled tooth for pushing the workpieces individually off of the carrier, such that the beveled tooth precisely aligns with one of the workpieces and is tapered in at least two dimensions to provide a small contact area for said one of the workpieces;

a detainment mechanism for receiving the workpieces when they are displaced from the carrier by the bimodal pitch adjustment device, the detainment mechanism having a block, a retention feature removably mounted to the block, spring-loaded keys extending from the retention feature, and workpiece-separating teeth on the block to hold each individual workpiece in the detainment mechanism;

a row realignment mechanism for realigning the workpieces in the detainment mechanism along the z-axis; and a control processor for controlling operations of the apparatus along the x, y, and z axes, the control processor having full control of all critical process parameters, including accurate and repeatable workpiece placement, controlled temperature and heat flow, and controlled mechanical removal pressure, temporal control, and variability.

17. The apparatus of claim 16, wherein the block and the keys are formed from materials that do not react with either the thermally activated adhesive or the workpieces.

18. The apparatus of claim 16, wherein the workpieces are spaced apart from each other at a first y-axis pitch when they are located in the carrier, and the workpieces are spaced apart from each other at a second y-axis pitch, that differs from the first y-axis pitch, when they are located in the detainment mechanism, and the apparatus moves at least one of the heating element, the bimodal pitch adjustment device, and the detainment mechanism incrementally along the y-axis with respect to each other to facilitate alignment therebetween.

* * * * *